H. S. FRANK.
PROCESS OF MAKING PISTON RINGS.
APPLICATION FILED DEC. 7, 1918.
1,353,227.
Patented Sept. 21, 1920.
2 SHEETS—SHEET 1.
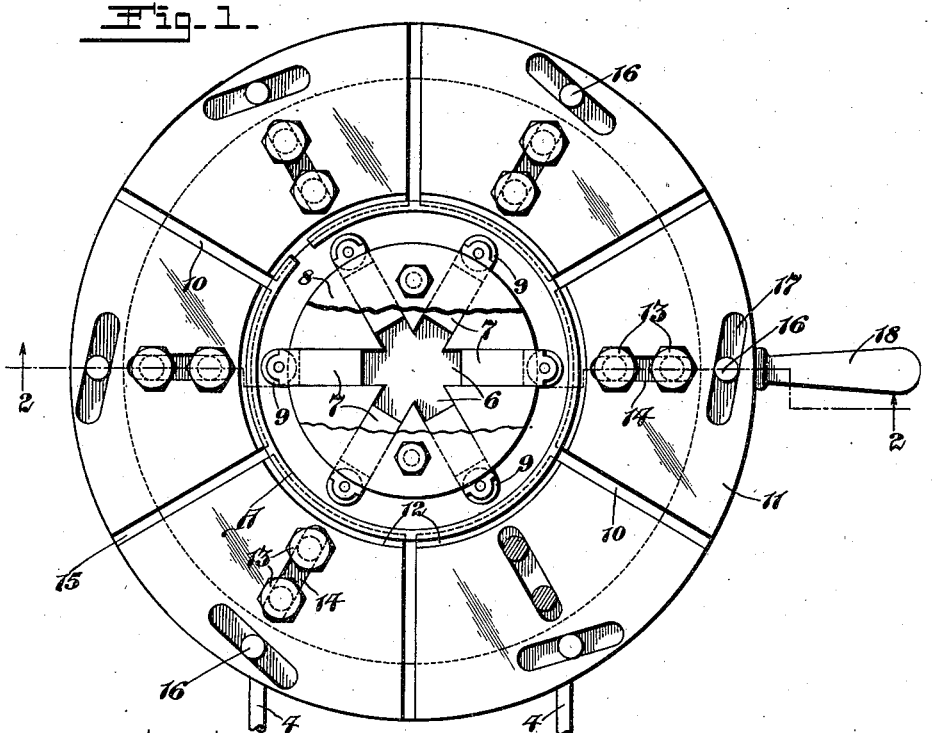
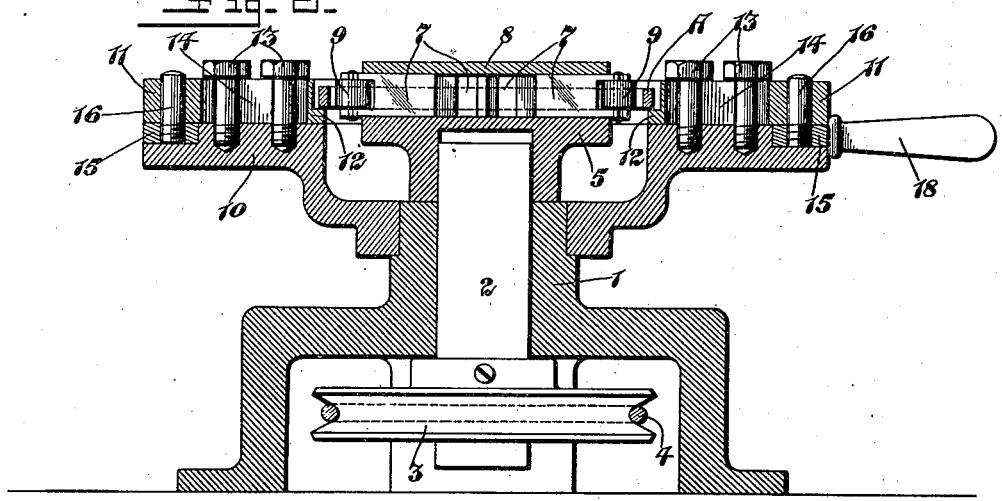
Inventor
Harry S. Frank,
By Rippey & Kingland,
His Attorneys
Attest
Charles A. Becker

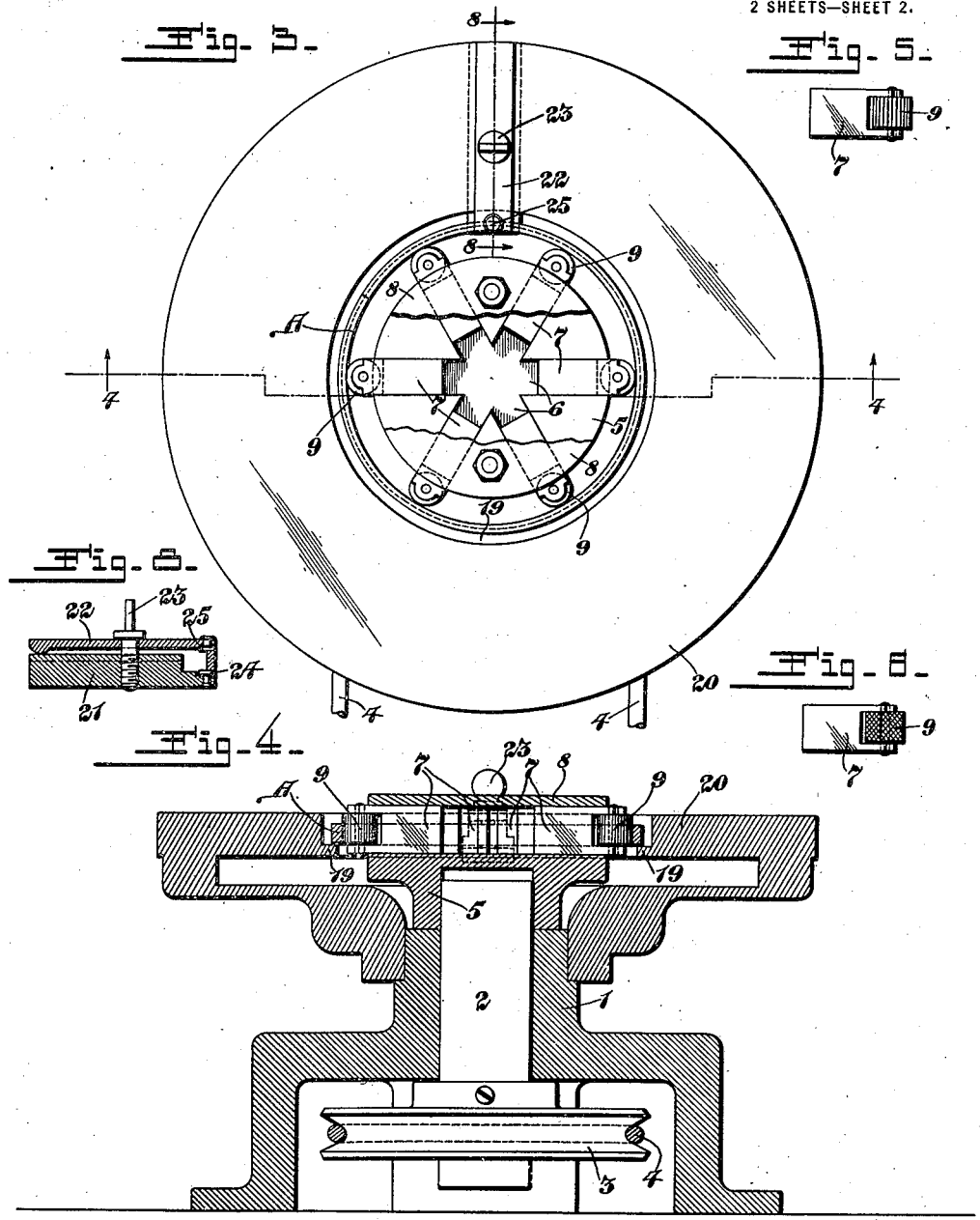

UNITED STATES PATENT OFFICE.

HARRY S. FRANK, OF ST. LOUIS, MISSOURI.

PROCESS OF MAKING PISTON-RINGS.

1,353,227.  Specification of Letters Patent.  Patented Sept. 21, 1920.

Application filed December 7, 1918. Serial No. 265,723.

*To all whom it may concern:*

Be it known that I, HARRY S. FRANK, a citizen of the United States, residing at the city of St. Louis and State of Missouri, have invented a new and useful Process of Making Piston-Rings, of which the following is a specification.

This invention relates to the art of shaping piston rings.

An object of the invention is to provide a novel art or process for shaping piston rings whereby the form of rings, of either perfect or imperfect circular form, may be changed to produce rings of the desired shape and dimensions.

Another object of the invention is to provide a novel method of treating rings to produce finished rings of any desired shape and dimensions by the application of radial pressure applied by centrifugal force to the inner and outer walls of the rings sufficient to change the molecular construction or arrangement and set the material in the desired shape.

Other objects of the invention will appear from the following description, reference being made to the accompanying drawings in which an appropriate machine for practising the invention is illustrated, and in which—

Figure 1 is a plan view with a part thereof removed showing a machine for applying pressure to the ring to modify the shape thereof.

Fig. 2 is a cross sectional view on the line 2—2 of Fig. 1.

Fig. 3 is a plan view of another form of machine.

Fig. 4 is a cross sectional view thereof on the line 4—4 of Fig. 3.

Figs. 5, 6 and 7 are views illustrating different forms of rollers adapted for use in the machine to apply pressure to and modify the shape of rings.

Fig. 8 is a view illustrating a form of device for holding the ring in proper position in the machine.

The process by which the rings are given their desired shape is better understood when considered in connection with a machine for practising the process.

As shown in Figs. 1 and 2 the machine includes a frame 1 in which a vertical shaft 2 is journaled. The shaft 2 may be equipped with a wheel or pulley 3 adapted to be rotated by means of a belt or cable 4, or otherwise as desired.

The upper end of the shaft 2 is connected with a head 5 having formed therein one or more radial grooves or guides 6. In each of the grooves or guides 6 a sliding member or actuator 7 is mounted. The actuators 7 are capable of free radial movement in the guides in which they are mounted so that when the head 5 is rotated the actuators are moved outwardly by centrifugal force. The actuators may be retained in place by a plate 8 secured to the head 5, or by other appropriate retaining means.

The outer end of each actuator supports a roller 9. The axes of the rollers 9 are parallel with the axis of the shaft 2 so that the rollers will revolve freely against the ring to be treated thereby.

The frame 1 supports a table or shelf 10 upon which are mounted a number of segmental members 11. When it is desired to form a perfectly circular ring a series of members 11 are employed whose inner edges are in circular alinement so that when the rings are rolled or pressed against the members 11 they will eventually be given a circular shape. In case it is desired to make rings of any other shape as, for instance, oval or eccentric, members 11 are employed having their inner edges of the shape to form the ring in whatever shape it may be desired to form it. As shown the members 11 have supporting ledges 12 to support the rings as they are treated. The members 11 are retained in position by bolts 13 passing through radial slots 14 and engaging with the table or shelf 10, thus permitting the members 11 to be adjusted radially.

The members 11 may be accurately moved to and retained in any desired radial adjustment. For this purpose a manipulating device is provided consisting of a ring 15 supported by the table or shelf 10 and having pins 16 extending into appropriately shaped slots 17 in the members 11. As a result of this construction it is apparent that when the ring 15 is turned in one direction the members 11 will be moved inwardly; and when the ring 15 is turned in the other direction the members 11 will be moved outwardly. As shown, the ring 15 is provided with a handle 18 for manipulation thereof.

In order to treat a ring and to give the same a desired shape and dimension, the ring is placed upon the ledge 12 of the members 11 whose inner edges are properly formed for the shape and dimensions desired. Then pressure is successively applied equally against every point on the inner periphery of the ring by rapid rotation of the rollers 9 on their axes and planetary movement thereof around the axis of the driving shaft 2. The pressure results from the centrifugal force of the rollers 9 actuated centrifugally by the actuator 7, the same pressure being applied against all circumferential points of the ring, and varying at all points equally according to the speed of rotation of the actuators and rollers around the center axis. If the ring is heated before being placed upon the shelf it is obvious that the change in shape and dimension of the ring will be more quickly effected, due to the fact that molecular rearrangement thereof will result more quickly in heated metal than in metal which is not heated. Nevertheless, it is not considered essential that the rings be heated in order to modify the shape or size thereof, though in most cases the use of heat is preferable. The application of the pressure is continued until the ring has been shaped as desired.

The mechanism shown in Figs. 1 and 2 is specially adapted for use in reducing the dimensions of a ring which is too large for the purpose desired, though the use of said mechanism is not so restricted; for such mechanism may also be used to enlarge the dimensions of a ring which is too small for the purpose desired. When it is desired to reduce the dimensions of a ring, the ring is placed in the position of the ring A in Fig. 1, the handle 18 is then operated to move the members 11 inwardly to compress the ring to the desired dimensions; after which the mechanism for treating the ring is operated and continued in operation until the molecular arrangement of the ring has been changed and the material set in the changed shape.

The mechanism illustrated in Figs. 3 and 4 is specially adapted for use in treating rings which are too small for the purposes for which it is desired to use them. In the case of the machine shown in Figs. 3 and 4 the rings are supported upon a ledge 19 formed on a table 20 of slightly different form from the table 10 shown in Figs. 1 and 2. The ring may be prevented from rotating with the mechanism for treatment thereof by any appropriate means such, for instance, as that shown. The means for preventing rotation of the ring during treatment thereof consists of a clamp composed of a lower member 21, an upper member 22, and a clamping screw 23. As shown, the lower member is provided with a rotary disk 24 and the upper member is provided with a similar disk 25 between which the ring is placed, and clamped in position by means of the screw 23. The clamp member thus constructed is movable radially in a guide in the table 20 so that there is no interference with the proper treatment of the ring throughout its circumference. The disks 24 and 25 permit proper change in the shape and dimensions of the ring during treatment thereof while preventing the ring from turning.

In the use of the machine shown in Figs. 3 and 4 the ring is placed upon the ledge 19 and properly clamped in position by the clamping device; after which the mechanism for treatment of the ring is placed in operation and the operation thereof continued until the shape and dimensions of the ring have been changed and the material set in the changed form. By the specific mechanism shown the ring will be given a circular shape, due to the fact that the inner wall of the table 20 is circular, though it is apparent that the rings may be given any desired shape by providing tables having inner walls properly formed for the results desired.

The rollers 9 in the case of either machine may be of any desired shape. For instance, the periphery of the roller shown in Fig. 5 is formed with longitudinal ribs, while the periphery of the roller 9 shown in Fig. 6 is knurled or spotted. The roller 9 shown in Fig. 7 is concaved, so as to extend above the upper and below the lower edges of the ring, thus holding the ring in position during treatment of the ring.

The side edges of the rings may be finished either before or after treatment, and I do not confine myself in this respect or in other unessential particulars. What I claim and desire to secure by Letters Patent of the United States, is:—

1. The process of shaping a piston ring which comprises placing and holding the ring from rotating in a form of a size different from the size of the ring and of the shape which it is desired to give to the ring; and subjecting the ring to outward radial pressure applied successively, and at spaced distances apart to all circumferential points of the ring, until the molecular arrangement of the ring is changed and the material is set in the size and shape of the form.

2. The process of changing the shape and size of a piston ring which comprises placing the ring in a form of the size and shape which it is desired to give to the ring and different from the size and shape of the ring when the ring is placed in the form, and forcing a radially movable pressure device against the inner surface of the ring by centrifugal force, and continuing the pressure of said devices by centrifugal force until the size and shape of the ring is changed to the size and shape of the form, and until the material of the ring is set in the changed shape.

3. The process of shaping a piston ring which consists in heating the ring; placing the heated ring in a form of the size and shape which it is desired to give to the ring and which is different from the size and shape of the ring when the ring is placed in the form; and actuating pressure devices against the inner surface of the ring by centrifugal pressure until the size and shape of the ring is changed to the size and shape of the form, and the material is set in the changed shape.

4. The process of changing the shape and size of a piston ring which is too large for the purpose desired which consists in heating the ring, placing the ring within a form smaller than the size of the ring before the ring is placed therein, and having a shape and size which it is desired to give to the ring; and applying centrifugal pressure successively against all points of the inner portion of the ring until the shape and size of the ring are changed to the shape and size of the form in which the ring is placed, and the material is set in the changed shape and size.

HARRY S. FRANK.